Walter DOUGLASS
Alfred DOUGLASS
Philip A. Hiley DYSON
*Inventors*

Walter DOUGLASS
Alfred DOUGLASS
Philip A. Hiley DYSON
*Inventors*

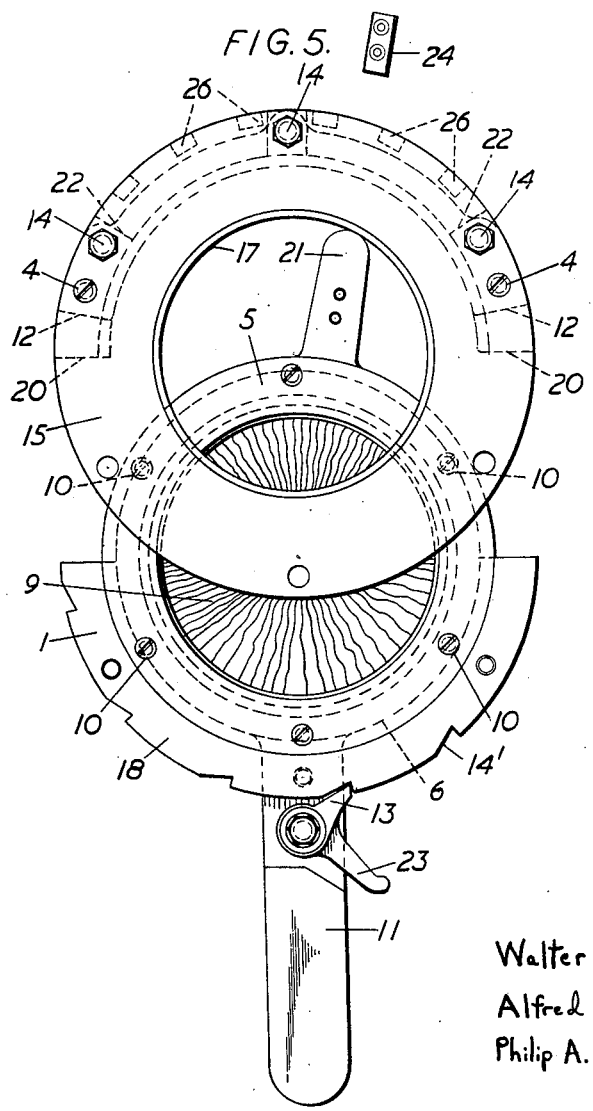

United States Patent Office 3,058,483
Patented Oct. 16, 1962

3,058,483
IRIS VALVE
Walter Douglass, Chorleywood, Alfred Douglass, North Harrow, and Philip Aston Hiley Dyson, Pinner, England, assignors to Mucon Engineering Co. Ltd., Middlesex, England, a British company
Filed June 30, 1958, Ser. No. 745,513
2 Claims. (Cl. 137—315)

This invention relates to a mechanical valve for controlling the flow of materials of various kinds.

A valve for the above purpose is known from British Patent No. 535,489 and comprises a pair of relatively rotatable, co-axially arranged rings and a flexible sleeve folded back on itself, one end of the sleeve being secured to one ring and the other end of the sleeve being secured to the other ring such that upon relative rotation but non-axial movement of the rings the sleeve may be twisted between an open or "flow" position and a closed or "non-flow" position at which the sleeve simulates a diaphragm.

When a flexible sleeve valve has been in use for some time it may be found necessary to repair, replace or clean the flexible sleeve. To enable this to be performed, it has hitherto been necessary to detach the entire valve from the conduit or other position of use to enable the main parts of an annular valve body to be separated to achieve detachment of the sleeve. These operations and the subsequent re-installation of the valve are time-consuming and troublesome and usually require semi-skilled labour.

With a view to overcoming the disadvantages referred to in the preceding paragraph, the present invention comprises an improved construction of flexible sleeve valve employing an annular valve body within which is mounted a pair of relatively rotatable rings to which are connected the ends of a flexible sleeve folded back on itself, said valve body being provided with a segmental removable part which, when removed, exposes a gap through which the relatively rotatable rings with the attached flexible sleeve may be laterally withdrawn as a unit. After replacement of the flexible sleeve unit, the segmental part of the valve body is put back and secured in position.

Figure 1:
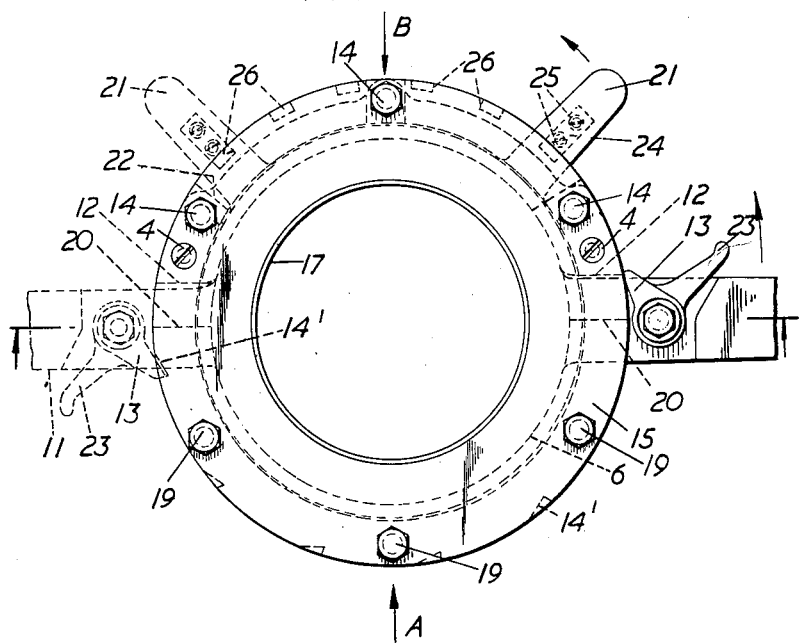
Figure 2:
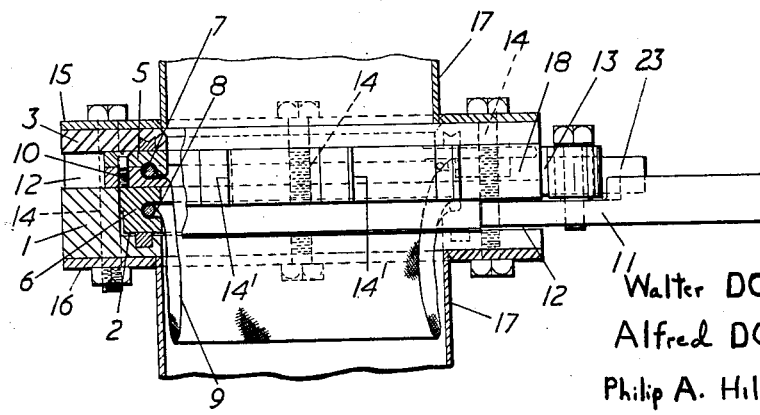
Figure 3:
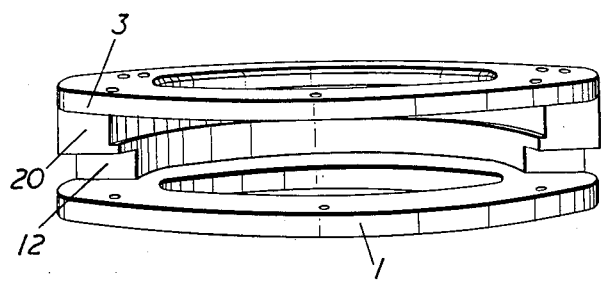
Figure 4:
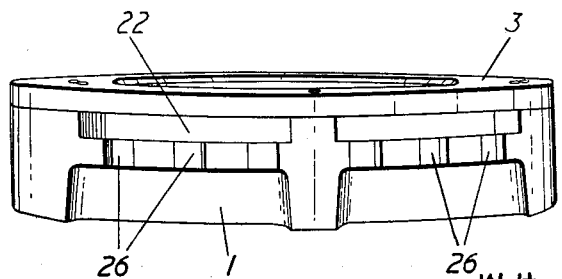

One example of a flow control valve embodying both of the above features of this invention will now be described with reference to the accompanying drawings, in which:

FIG. 1 is a plan view of the valve.
FIG. 2 is a front elevation, partly in section, of FIG. 1.
FIGS. 3 and 4 are perspective views in the direction of arrows A, B, respectively, of FIG. 1, these views showing an annular body without the remaining parts of the valve.
FIG. 5 is a plan view of the valve and shows the manner of detachment of a flexible sleeve unit thereof.

In the example, the flow control valve comprises a metal valve body of annular form and composed of two parts. One part 1 is made as a casting and includes an annular internal seating 2 for a flexible sleeve unit. The other part of the valve body comprises a flat, annular cover plate 3. Parts 1 and 3 are removably secured together by two counter-sunk screws 4, FIG. 1.

The flexible sleeve unit comprises a pair of rings 5, 6 to which are secured the ends 7, 8, respectively, of a sleeve 9 of flexible material folded back upon itself, said material being composed, for example, of fabric, nylon or rubber. The ring 5 is conveniently composed of two parts, as shown, to enable the associated sleeve end 7 to be clamped between the parts which are secured together by screws 10, FIGS. 2 and 5. The ring 5 is normally held stationary relative to the valve body 1, 3 and the other ring 6 is provided with a handle 11 which extends through an arcuate slot 12 extending radially through the valve body part 1. The slot is of such length that upon arcuate movement of the handle from one end of the slot to the other, the ring 6 is rotated to twist the flexible sleeve between an open or "flow" position, FIG. 2, and a closed or "non-flow" position at which the sleeve simulates a diaphragm. The extreme positions of the handle 11 are shown in full and dotted lines in FIG. 1. Different positions of adjustment of the flexible sleeve may be retained by the employment of a spring-loaded pawl 13, pivoted to the handle 11, for engaging one or other of a number of ratchet notches 14' formed in the outer cylindrical surface of the valve body 1. The pawl has an operating arm 23 for releasing the pawl from the engaged notch when it is desired to re-adjust the sleeve.

In use, the valve body is secured to a flow passage, as for instance, between flanged parts 15, 16 of a flow conduit 17. The valve body and flanged parts are secured together by bolts 14 inserted through registering holes in the flanged parts 15, 16 and in the valve body parts 1 and 3.

After a flexible sleeve valve constructed as above described has been in use for some time, it may be found that full movement of handle 11 through arcuate slot 12 does not result in the sleeve 9 simulating the proper diaphragm condition representing the closed position of the valve, this being due to shrinkage or stretch of the sleeve 9. In the case of sleeve stretch, the movement of the handle 11 from the full-line position to the dotted line position, FIG. 1, will not achieve full closure of the valve. In the event of sleeve shrinkage, the sleeve will be fully closed before the handle 11 reaches the dotted line position, and any attempt to force the handle through the full range of movement allowed by the slot 12 would result in the sleeve 9 being placed under strain, thereby leading to its damage or the detachment of the sleeve from rings 5, 6. Accordingly, the present invention comprises the provision of means in the valve assembly to enable a user to make adjustments of the valve to compensate for stretch or shrinkage of the sleeve without the need for dismantling the valve assembly. A preferred way of achieving such compensation will be hereinafter described.

According to the preferred way, means is provided for enabling the pre-set position of ring 5 to be changed at will with respect to ring 6.

For this purpose, the normally stationary ring 5 of the flexible sleeve unit is provided with a handle 21 that projects through an arcuate slot 22 extending radially through the valve body part 1 at a position substantially opposite to the slot 20 which is substantially co-extensive with slot 12 for the movement of the sleeve-opening and closing handle 11. The stationary ring 5 is normally retained in a predetermined position by means of a readily releasable device which, in the example, comprises a plate 24 connected by screws 25 to the handle 21. The plate engages at its inner end in one of a number of peripheral notches 26 in the valve body part 1. In order to compensate for shrinkage or stretch of the flexible sleeve 9, whilst the entire valve is in the position of use in, for example the conduit 17, the securing plate 24 is unscrewed and removed to enable the ring 5 to be rotated by its handle 21 in one direction or the other according to the nature of sleeve adjustment required. The extreme positions for the handle 21 are shown in full and dotted lines in FIG. 1. In this adjustment, the handle 21 is brought into alignment with one or other of the notches 26 in the valve body part 3 and the securing plate 24 is then re-applied and secured in position on the handle 21, the plate then engaging the oppositely disposed notch 26. It will be appreciated that in this "truing" adjustment of the stationary ring, the other or valve-operating ring 6 remains stationary. This adjustment ensures that when the handle is subsequently moved through its full closing range to rotate the ring 6 with respect to ring 5, the sleeve 9 will be fully twisted into its diaphragm condition and will effectively interrupt flow of material through the valve.

After prolonged use of the valve or for other reasons, it may be necessary to remove the flexible sleeve 9 for repair, replacement or cleaning thereof. In order to effect this without removal of the control valve as a whole, including the valve body, from the conduit 15—17, an arcuate part 18 of the valve body part 1 is made removeable. This arcuate part is normally held in place by three bolts 19 screwed into tapped holes in the body part 3 and arcuate part 18, said bolts also passing through holes in the flange 15. Upon removal of the bolts 19, the arcuate part 18 may be removed laterally to expose an arcuate opening 20 extending radially through the body part 1. The flexible sleeve unit is withdrawn through the gap or space formed by this opening 20 and slot 12 by applying an outward pull on the operating handle 11, see FIG. 5. It will, of course, be understood that the retaining plate 24 of the stationary ring 5 has to be removed before the flexible sleeve unit can be withdrawn laterally from the valve body 1 through the slot 20, 12. Before withdrawal of the sleeve unit, the operating handle 11 is rotated to occupy a position, FIG. 5, approximately opposite the handle 21. This avoids jamming of the unit during withdrawal. The arcuate part 18 may be withdrawn along with the sleeve unit when the sleeve unit is withdrawn through the space formed by slot 12 and opening 20, and then arcuate part 18 is lifted out of engagement with the pawl 13 and the sleeve 9 is then accessible for repair, cleaning or replacement after removal of screws 10. A converse sequence of operations is, of course, followed when the or another flexible sleeve unit 5, 6, 9 is inserted radially through the slots 20 and 12 of the valve body.

It is to be understood that a flow control valve may be provided with both of the two features hereinbefore described, i.e. the means for facilitating the lateral removal or insertion of the flexible sleeve unit, and the means to permit adjustment of the flexible sleeve to compensate for shrinkage or stretch of the material of which it is made, or may be provided only with the means for facilitating the lateral removal or insertion of the flexible sleeve unit.

We claim:

1. A flow control iris valve comprising a mountable annular valve body having a continuous circular valve body base ring with an axial opening therein for the passage of material, an upwardly extending semicylindrical abutment connected to said valve body base ring and concentric with said valve body base ring and having an inner bore surface of greater radius than that of said axial opening to provide an upwardly facing annular seat on said valve body base ring, a valve body upper ring connected to the top of said abutment and having an axial opening with substantially the same diameter as that on said valve body base ring and having a downwardly facing annular seat thereon spaced from the upwardly facing annular seat, a pair of co-axial sleeve attachment rings rotatably mounted between and with respect to said seats within said valve body and having circumferential portions of the edges thereof guided by the bore surface of said semicylindrical abutment and having the faces thereof guided by said seats, a flexible sleeve folded back on itself with one end secured to one sleeve attachment ring and the other end secured to the other sleeve attachment ring, lock means to hold one of said sleeve attachment rings relative to said valve body, a valve operating handle projecting laterally from the other of said rings, and a semicylindrical member detachably secured to and forming part of said valve body and lying against one of said valve body rings and mating with a part of said abutment to hold said sleeve attachment rings in their guided position against said semicylindrical abutment and guide the remainder of the edges of both of said sleeve attachment rings and having a face spaced from the other valve body ring to define a slot through which said handle extends to operate said valve, said semicylindrical member being removable to leave an arcuate opening which forms together with said slot a space defined between said valve body rings, and said sleeve attachment rings and sleeve being removable and replaceable laterally from said valve body through said space.

2. A flow control valve as claimed in claim 1 in which said lock means comprises a second handle, said second handle being on said one of said sleeve attachment rings, and said abutment having a further slot therein through which said handle projects, and pawl means on said second handle engageable with said valve body for locking said second handle in position.

References Cited in the file of this patent

UNITED STATES PATENTS

| Re. 5,585 | Seal | Sept. 30, 1873 |
| 1,346,887 | Heald | July 20, 1920 |
| 1,558,992 | Lombardi | Oct. 27, 1925 |
| 2,740,423 | Stillwagon | Apr. 3, 1956 |
| 2,961,213 | Philippovic | Nov. 22, 1960 |

FOREIGN PATENTS

| 7,045 | Great Britain | of 1915 |
| 11,766 | Great Britain | of 1884 |
| 379,670 | Germany | of 1923 |
| 634,975 | Great Britain | of 1950 |